(12) United States Patent
Huang et al.

(10) Patent No.: US 8,699,748 B2
(45) Date of Patent: Apr. 15, 2014

(54) TRACKING SYSTEM AND METHOD FOR REGIONS OF INTEREST AND COMPUTER PROGRAM PRODUCT THEREOF

(75) Inventors: Chung-Hsien Huang, Tainan (TW); Ming-Yu Shih, Taoyuan (TW)

(73) Assignee: Industrial Technology Research Institute, Hsinchu (TW)

(*) Notice: Subject to any disclaimer, the term of this patent is extended or adjusted under 35 U.S.C. 154(b) by 619 days.

(21) Appl. No.: 12/977,540

(22) Filed: Dec. 23, 2010

(65) Prior Publication Data
US 2012/0093361 A1  Apr. 19, 2012

(30) Foreign Application Priority Data

Oct. 13, 2010  (TW) ................................ 99134912 A

(51) Int. Cl.
*G06K 9/00* (2006.01)
*H04N 5/225* (2006.01)
*H04B 1/66* (2006.01)

(52) U.S. Cl.
USPC ........... 382/103; 382/190; 382/236; 348/169; 375/240

(58) Field of Classification Search
None
See application file for complete search history.

(56) References Cited

U.S. PATENT DOCUMENTS

| | | | |
|---|---|---|---|
| 5,454,043 A * | 9/1995 | Freeman | ....................... 382/168 |
| 6,757,434 B2 | 6/2004 | Miled et al. | |
| 7,373,012 B2 | 5/2008 | Avidan et al. | |
| 7,596,241 B2 | 9/2009 | Rittscher et al. | |
| 7,627,178 B2 | 12/2009 | Suzuki et al. | |
| 7,864,980 B2 * | 1/2011 | Evans | ........................... 382/103 |
| 2006/0227997 A1 * | 10/2006 | Au et al. | ......................... 382/103 |
| 2006/0258018 A1 * | 11/2006 | Curl et al. | ..................... 436/180 |
| 2007/0133840 A1 | 6/2007 | Cilia | |
| 2008/0019568 A1 * | 1/2008 | Nishiura | ....................... 382/103 |
| 2010/0045800 A1 | 2/2010 | Chebil et al. | |

FOREIGN PATENT DOCUMENTS

| | | |
|---|---|---|
| CN | 1711551 A | 12/2005 |
| CN | 101145088 A | 3/2008 |
| CN | 101526944 A | 9/2009 |
| CN | 101556692 A | 10/2009 |
| TW | 594591 B | 6/2004 |
| TW | 200919375 | 5/2009 |

OTHER PUBLICATIONS

China Patent Office, Office Action, Patent Application Serial No. CN201010522324.3, Apr. 3, 2013, China.
I. Cohen and G. Medioni, "Detecting and Tracking Moving Objects in Video from an Airborne Observer," in Proceedings of Image Understanding Workshop, 1998.

(Continued)

*Primary Examiner* — Manav Seth
(74) *Attorney, Agent, or Firm* — Rabin & Berdo, P.C.

(57) ABSTRACT

In one exemplary embodiment, a tracking system for region-of-interest (ROI) performs a feature-point detection locally on an ROI of an image frame at an initial time via a feature point detecting and tracking module, and tracks the detected features. A linear transformation module finds out a transform relationship between two ROIs of two consecutive image frames, by using a plurality of corresponding feature points. An estimation and update module predicts and corrects a moving location for the ROI at a current time. Based on the result corrected by the estimation and update module, an outlier rejection module removes at least an outlier outside the ROI.

15 Claims, 10 Drawing Sheets

(56) References Cited

OTHER PUBLICATIONS

I. Cohen and G. Medioni, "Detecting and Tracking Moving Objects for Video Surveillance," in Proceedings of International Conference on Computer Vision and Pattern Recognition, vol. 2, pp. 2319-2325, 1999.

P. O. Arambel, J. Silver, M. Antone and T. Strat, "Signature-Aided Air-to-Ground Video Tracking," in Proceedings of International Conference on Information Fusion, 2006.

S. Ali and M. Shah, "COCOA—Tracking in Aerial Imagery, SPIE Airborne Intelligence," in Proceedings of International Conference on Surveillance, Reconnaissance (ISR) Systems and Applications, Orlando, 2006.

S. Ali, V. Reilly and M. Shah, "Motion and Appearance Contexts for Tracking and Re-Acquiring Targets in Aerial Videos," in Proceedings of International Conference on Computer Vision and Pattern Recognition, 2007.

T. Mauther, M. Donoser and H. Bischof, "Robust Tracking and Spatial Related Components," in Proceedings of International Conference on Computer Vision and Pattern Recognition, 2008.

A. P. Brown, K. J. Sullivan and D. J. Miller, "Feature-Aided Multiple Target Tracking in the Image Plane," in Proceedings of the SPIE, vol. 6229, pp. 62290Q, 2006.

J. Xiao, C. Yang, F. Han and H. Cheng, "Vehicle and Person Tracking in UAV Videos," in Proceedings of Multimodal Technologies for Perception of Humans: International Evaluation Workshops, pp. 215-220, 2008.

Y.-C. Chung and Z. He, "Low-Complexity and Reliable Moving Objects Detection and Tracking for Aerial Video Surveillance with Small UAVS," IEEE International Symposium on Circuits and Systems, pp. 2670-2673, 2007.

W. Koch, J. Koller and M. Ulmke, "Ground Traget Tracking and Road Map Extraction," Journal of Photogrammetry & Remote Sensing (ISPRS), vol. 61, pp. 197-208, 2006.

C. Harris and M. Stephens, "A Combined Corner and Edge Detector," in Proceedings of the 4th Alvey Vision Conference, pp. 147-151, 1988.

R. E. Kalman, "A new approach to linear filtering and prediction problems," Journal of Basic Engineering, vol. 82, No. 1, pp. 35-45, 1960.

"A Hybrid Moving Object Detection Method for Aerial Images", Chung-Hsien Huang, Yi-Ta Wu, Jau-Hong Kao, Ming-Yu Shih, Cheng-Chuan Chou, ICL Technical Journal Jun. 25, 2010, p. 67-p. 74.

Taiwan Patent Office, Office Action, Patent Application Serial No. TW099134912, Jul. 24, 2013, Taiwan.

Garcia et al., Region-of-interest Tracking based on Keypoint Trajectories on a Group of Pictures, International Workshop on Content-based Multimedia Indexing, 2007, pp. 198-203.

\* cited by examiner

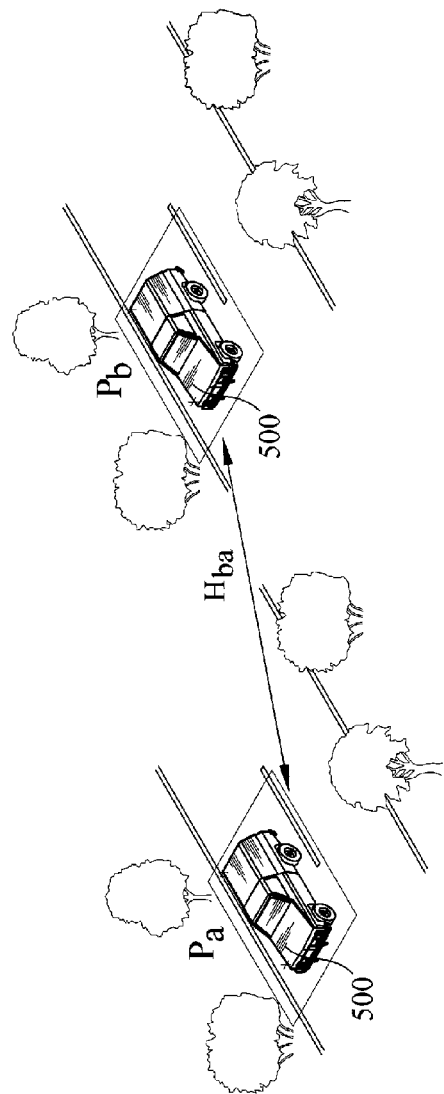
FIG. 6C
FIG. 6B
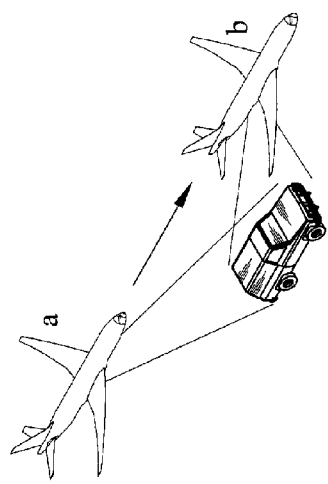
FIG. 6A

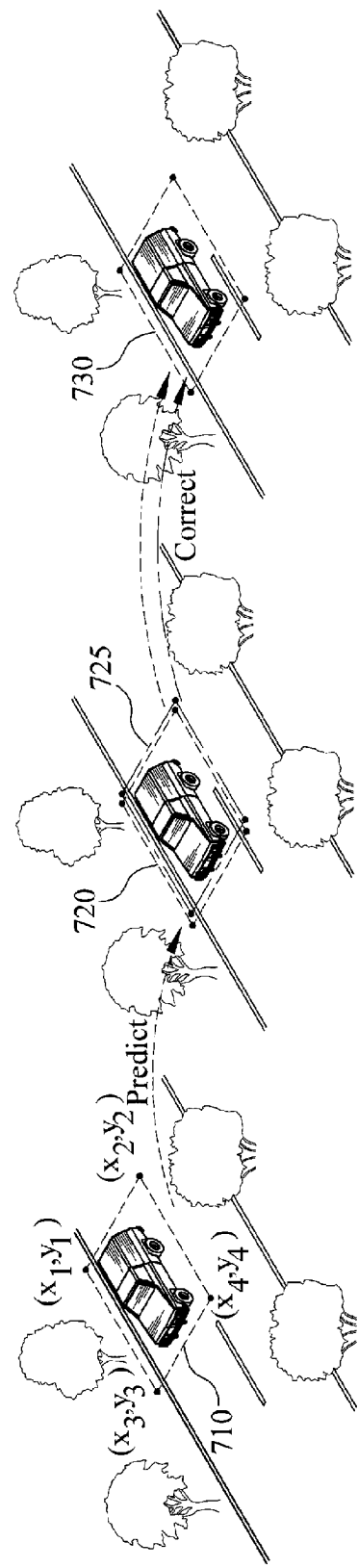

TRACKING SYSTEM AND METHOD FOR REGIONS OF INTEREST AND COMPUTER PROGRAM PRODUCT THEREOF

TECHNICAL FIELD

The disclosure generally relates to a tracking system and method for region of interest (ROI) and computer program product thereof.

BACKGROUND

As the popularity of intelligent surveillance system gradually rises, some technologies focus the development on using the image analysis technique in the back-end system to capture meaningful event information. A stationary camera has limited coverage range and has blind spots. When an event occurs in a larger region, the fixed camera cannot obtain the surveillance screens of the entire event easily. Some technologies explores the possibility to use flying carrier, such as, hot air balloon, unmanned airplane, to fly with the camera to take the bird's eye view of the ground event and analyze the detected image, as an aid to the ground surveillance system for large region detection to eliminate the blind spots.

Among the tracking technologies of ground objects via computer vision on flying carrier, the moving object detection technology, such as, uses affine warping technology to perform mutual registration of the consecutive images of a moving object, and then computes the normal flow of the two consecutive stabilized images to detect the moving object. Then, a four-connectivity connected component labeling technology is used to label the objects. For labeled objects in each image, the attributes, such as, center of mass, axis orientation, length, and so on, are used to compute the affinity of the objects in the neighboring images and association is assigned to enable the moving object tracking.

There are three major strategies for moving object tracking. The first is to use KLT tracker to associate the objects in neighboring images. The second is to compute the appearance and movement feature of the object, and uses a threshold to determine the association of the moving objects in neighboring images to uses the features of the majority of the moving objects to compute the optimal match probability. The third is to use filer, such as particle filter, for moving object tracking.

Vision-based tracking of region of interest (ROI) can be based on image template matching or based on feature tracking. The former tracking technology is based on the image feature of the ROI, and searches for the maximum affinity response region in the next image, for example, the mean shift scheme uses the gradient information of the feature space computed via the mean shift scheme to rapidly find the tracking target region. The latter is to detect feature points in the ROI, and uses KLT tracker to track the correspondence between the features of two consecutive images. The correspondence relationship is the basis for tracking the ROI. For example, random sample consensus (RANSAC) is based on the law of large numbers, and selects a plurality of feature points randomly to estimate the homography transform of ROI between the two consecutive images, and uses recursion to find the homography transform that matches the majority of all the feature points best. When the number of the correct or suitable inliers is too few, the RANSAC method requires a plurality of recursion. That is, a large amount of computing resource must be consumed to obtain reliable tracking result.

The vision-based tracking of ROI patents, such as, U.S. Pat. No. 6,757,434 disclosed a tracking technology for ROI of video images, applicable to image compression. As shown in FIG. 1, the technology, aiming at ROI 110 of the (k−1)-th image, uses boundary projection to predict the boundary 120 of ROI in the k-th image, and reversely finds matching point 130 in (k−1)-th image. U.S. Publication No. US2010/0045800 disclosed a technology to divide the ROI into inner circle and outer circle and computes the color histogram of the inner and outer circles as features separately to act as a basis for tracking.

Image-based tracking of ROI papers, for example, "Region-of-interest Tracking based on Keypoint Trajectories on a Group of Pictures", International Workshop on Content-based Multimedia Indexing, 2007, disclosed a technology to use M-estimator to estimate the affine transform of the ROI in two consecutive images, and use an optimization algorithm to solve the M-estimator problem. This technology uses statistics significance to remove outliers. The optimization process will consume a large amount of computing resources.

The current flying carrier object tracking technology usually needs a large amount of computing resources. Basically, a PC-level or higher computing device is needed for real-time computing. However, the flying carrier has limited load weight capacity; therefore, a light embedded system is more appropriate. Hence, the object tracking algorithm needs fast and efficient computation.

SUMMARY

The exemplary embodiments of the present disclosure may provide a tracking system and method for Region-of-interest (ROI) and the computer program product thereof.

A disclosed exemplary embodiment relates to a tracking system for ROI. The system comprises a feature point detecting and tracking module, a linear transformation module, an estimation and update module, and an outlier rejection module. At an initial time, the feature point detecting and tracking module performs feature point detection locally on an ROI of an image frame, and then tracks at least one detected feature point. The linear transformation module uses a plurality of tracked corresponding feature points to obtain the transformation relationship of the ROI between two consecutive images. The estimation and update module predicts and updates the location of the ROI at a current time. The outlier rejection module uses the update result from the estimation and update module to reject at least an outlier outside of the ROI.

Another disclosed exemplary embodiment relates to a tracking method for ROI. The tracking method comprises: executing a feature point detection locally on an ROI of an image frame at an initial time via a feature point detecting and tracking module, and tracking the detected features; finding out a transform relationship between two ROIs of two consecutive image frames via a linear transformation module, according to a plurality of corresponding tracked feature points; predicting and correcting a moving location for the ROI via an estimation and update module at a current time; based on the result corrected by the estimation and update module, removing at least an outlier outside the ROI via an outlier rejection module to; and setting re-detection conditions for a feature point to perform re-detection of the current ROI to obtain a tracking result within a stability range.

Yet another disclosed exemplary embodiment relates to a computer program product of tracking for ROI. The computer program product comprises a memory and an executable computer program stored in the memory. The computer program is executed by a processor for performing: executing a feature point detection locally on an ROI of an image frame at an initial time via a feature point detecting and tracking module, and tracking the detected features; finding out a transform relationship between two ROIs of two consecutive image frames via a linear transformation module, according to a plurality of corresponding tracked feature points; predicting and correcting a moving location for the ROI via an estimation and update module at a current time; based on the result corrected by the estimation and update module, removing at least an outlier outside the ROI via an outlier rejection module to; and setting re-detection conditions for a feature point to perform re-detection of the current ROI to obtain a tracking result within a stability range.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIGS. 6A-6C show exemplary schematic views illustrating the linear transformation module computes the transform relationship of ROIs of two consecutive image frames, consistent with certain disclosed embodiments.

FIGS. 7A-7C show exemplary schematic views illustrating the estimation and update module uses Kalman filter for filtering and ROI estimation, consistent with certain disclosed embodiments.

DETAILED DESCRIPTION OF THE EXEMPLARY EMBODIMENTS

The present disclosure may provide exemplary embodiments of image-based region-of-interest (ROI) tracking technology. The tracking technology combines feature point estimation and tracking, homography transformation estimation, filtering for tracking, and outlier rejection technique to execute ROI tracking. The ROI may be a moving object, fixed background, or both. The moving object may be a moving vehicle, motorcycle, boat, and so on. The fixed background may be a landscape, building, and so on. The boundary of the ROI may be regular or irregular in shape.

Through the homography perspective projection transformation based on feature point tracking, the movement scenario of the ROI may be estimated. With the prediction and update capability of the filter, the ROI may be tracked steadily and smoothly. Through the tracking result of the filter, the homography transformation may be re-estimated and outliers are removed.

Figure 1:
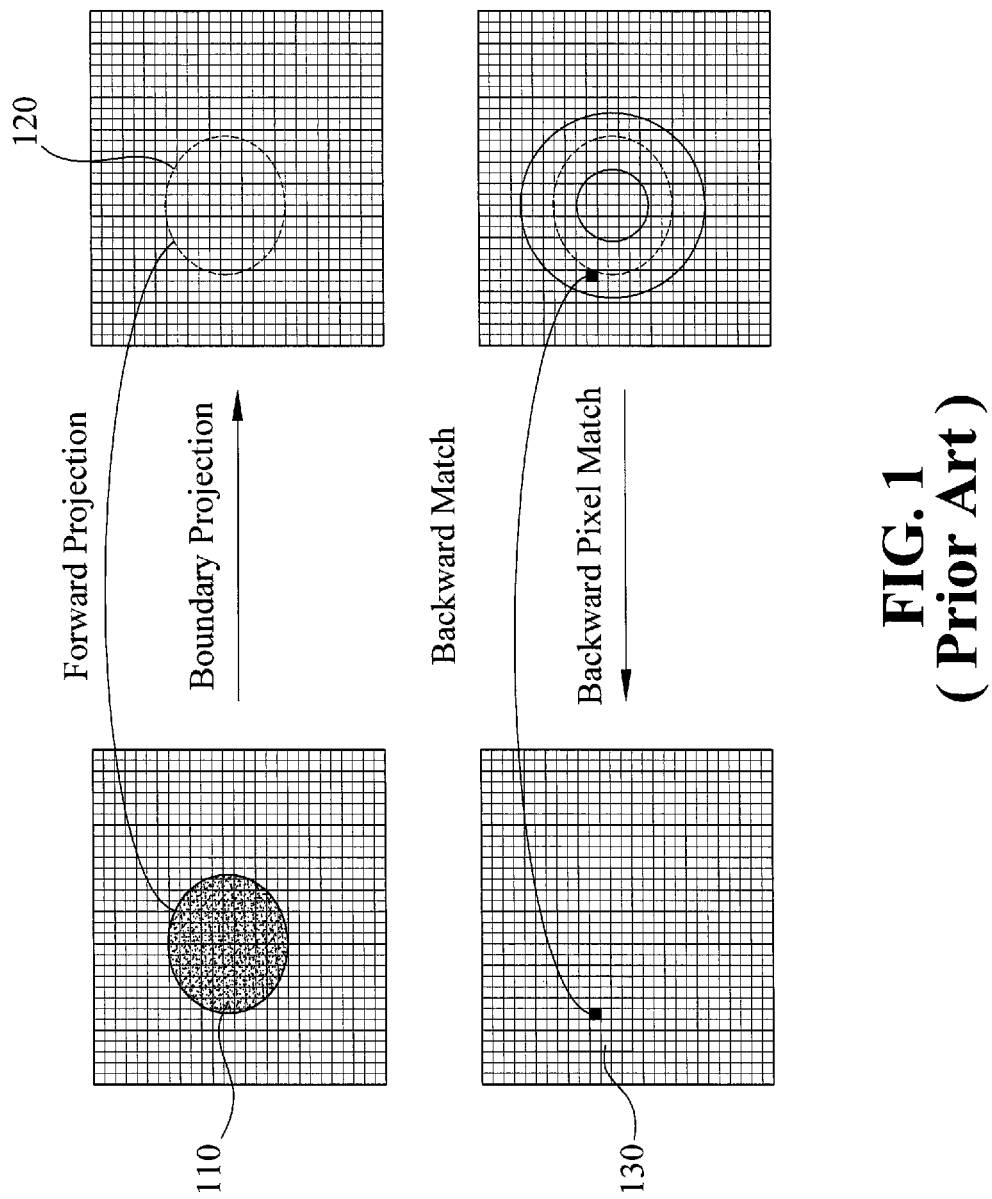
FIG. 1 shows an exemplary schematic view of an image-based ROI tracking technology.
Figure 2:
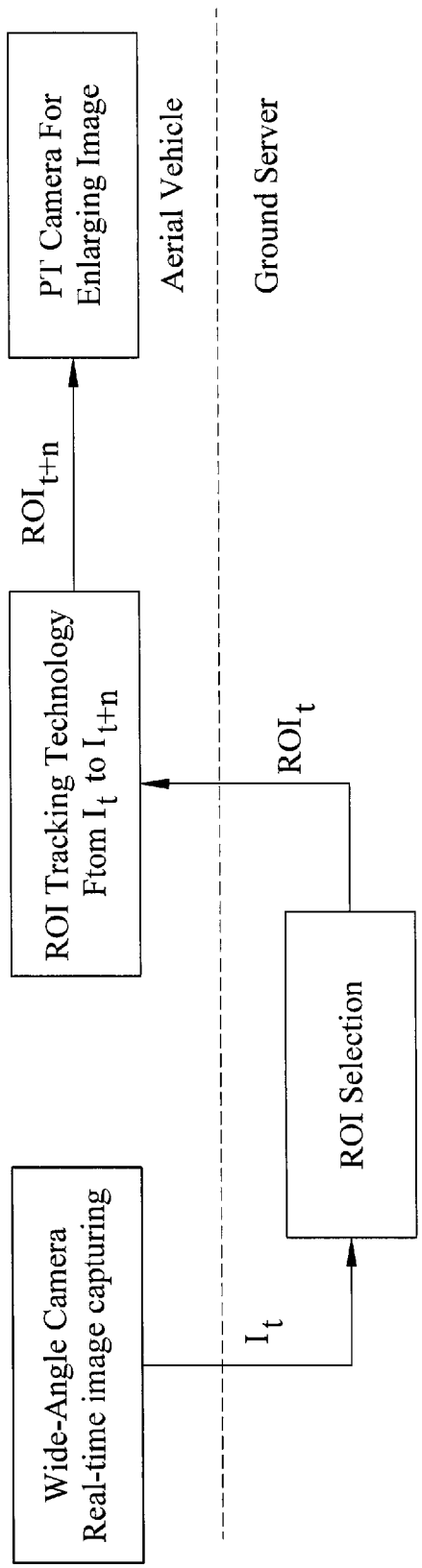
FIG. 2 shows an exemplary application scene of the ROI tracking technology, consistent with certain disclosed embodiments.

FIG. 2 shows an exemplary application scene of the ROI tracking technology, consistent with certain disclosed embodiments. In FIG. 2, a wide-angle camera and a pan/tilt camera are installed on an aerial vehicle. The wide-angle camera in the sky may view the large setting of the scene, and the PT camera has two dimension of freedom, i.e., pan and tilt, for rotation and partial enlargement of a specific region within the field of view of the wide-angle camera to obtain high-resolution image information. The wide-angle camera captures the image in real-time, and streams the obtained stream image $I_t$ back to the user of the ground server. The user may use, such as, mouse or touch screen to select the $ROI_t$ of stream $I_t$ at time t. The selected $ROI_t$ is transmitted via wireless signal back to the aerial vehicle to drive the PT camera to focus on the selected ROI for capturing high-resolution enlarged image to provide more detailed information to the ground user.

As shown in the scene of FIG. 2, because of the data transmission lag, at this point of time, image frame $I_{t+n}$ obtained by the wide-angle camera is the image frame at time t+n, and has a time difference n from the capturing time of stream image frame $I_t$, where n is the time required to transmit the image from aerial vehicle to the ground server. Therefore, the location of the ROI selected by the user will be different from the location of the real-time image captured by the aerial vehicle. Hence, an ROI tracking technology must be used to track the ROI from the image frame $I_t$ from the historic images temporarily stored in the system to the image frame $I_{t+n}$, so that the PT camera can be driven to the precise location. Therefore, the higher for the tracking speed is better. In addition, the tracking speed must be faster than the image capturing speed, for example, >30 frame/sec. The ROI tracking technology must process at least the queue image buffer storing all the images from time t to time t+n, and starts tracking the location of $ROI_t$ at time t to the location of $ROI_{t+n}$ in image frame $I_{t+n}$ at time t+n.

In addition to the application scene of FIG. 2, the ROI tracking technology may also be used in the cases of agricultural, fishery and animal husbandry observation and resource research, geographical landscape surveillance, weather observation and data collection, traffic surveillance and control, damage investigation of typhoon, oil spill and forest fire, aerial observation and photography, nuclear and bio-pollution and environmental monitoring, shipwreck search, soil and water conservation, landslide road damage, border patrol, oceanic fishery border patrol and protection, building and indoor image analysis, monitoring power line and oil pipe, and replacing expensive satellite.

Figure 3:
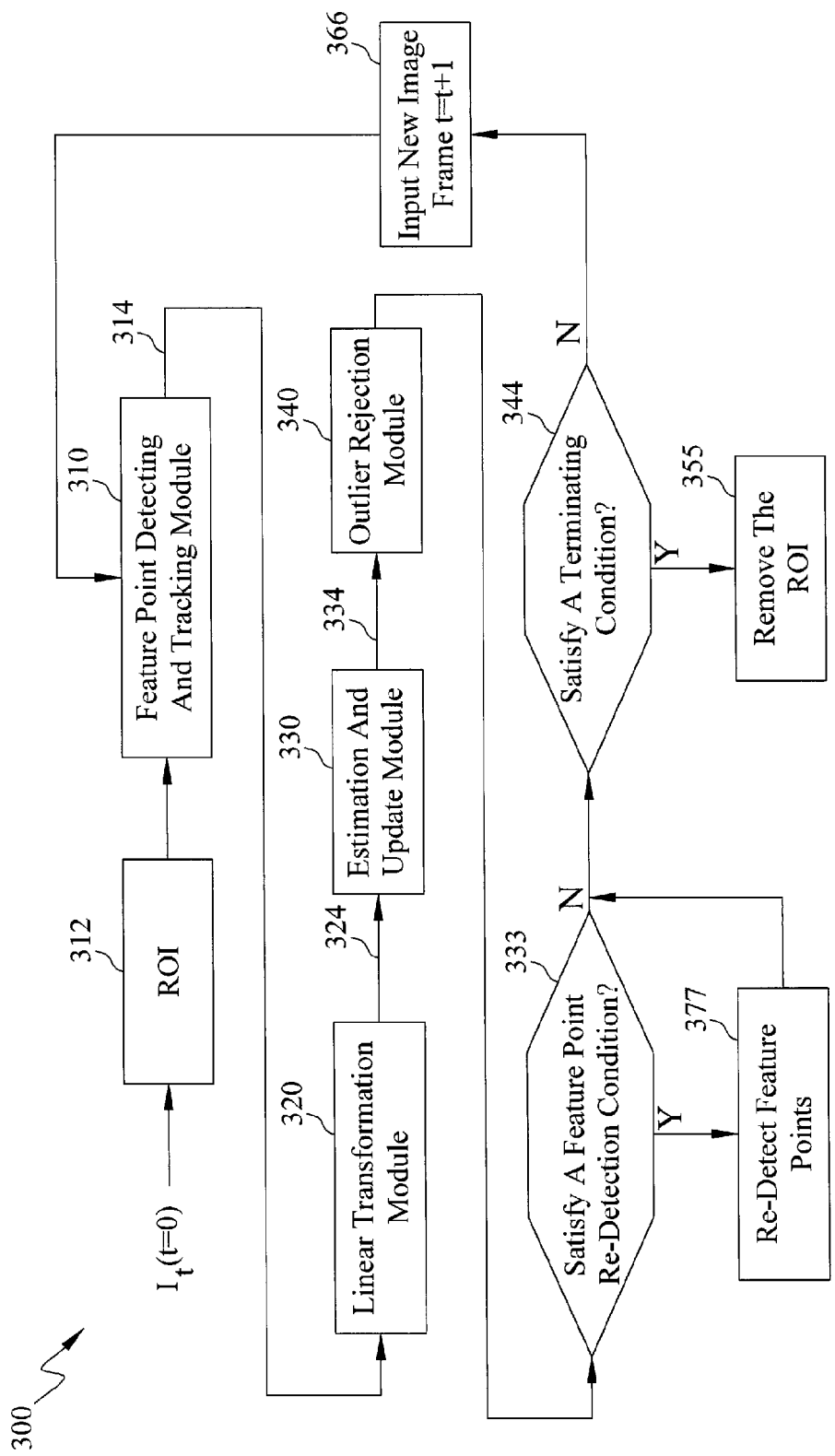
FIG. 3 shows an exemplary schematic view of a ROI tracking system, consistent with certain disclosed embodiments.

FIG. 3 shows an exemplary schematic view of a ROI tracking system, consistent with certain disclosed embodiments. As shown in FIG. 3, ROI tracking system 300 comprises a feature point detecting and tracking module 310, a linear transformation module 320, an estimation and update module 330 and an outlier rejection module 340.

Feature point detecting and tracking module 310 performs feature point detection locally on an ROI 312 of an image frame $I_t$ at an initial time (t=0), for example, using Harris feature point detection method to perform the local feature point detection, and tracks the detected feature points in image frame $I_t$, for example, using KLT method to track feature points. There are several ways to input ROI 312 into feature point detecting and tracking module 310, for example, the user may use a mouse or touch a screen to select a region in an image frame $I_t$, and then inputs the region to feature point detecting and tracking module 310. Linear transformation module 320 finds out a transform relationship between two ROIs of two consecutive image frames $I_t$, $I_{t+i}$, by using a plurality of corresponding feature points 314 tracked by feature point detecting and tracking module 310. The transform relationship is the so-called homography transform 324, and may be used to estimate the movement of ROI.

Estimation and update module 330, such as, using Kalman filter, predicts and corrects a moving location for the ROI at a current time. Based on corrected result 334 from estimation and update module 330, outlier rejection module 340 removes at least an outlier outside the ROI. As shown by mark 333, ROI tracking system may be configured to include conditions for feature point re-detection. For example, when the number of reliable feature points is less than a threshold, such as, less than the percentage of an initial points (marked as 377), the feature point detection is executed again to obtain stable and reliable tracking result of ROI.

A termination condition may also be included for ROI tracking (marked as 344). For example, when the ROI is located at the boundary of the image frame, the tracking on the ROI is terminated. In other worlds, the ROI is removed, marked as 355. Otherwise, a new image frame in inputted and time t is incremented by 1, shown as mark 366. Then, feature point detecting and tracking module 310 uses the KLT method to track feature points of the new image frame.

The following exemplar uses a moving vehicle to describe the operation theory and the result of the modules of ROI tracking system 300.

Figure 4C:
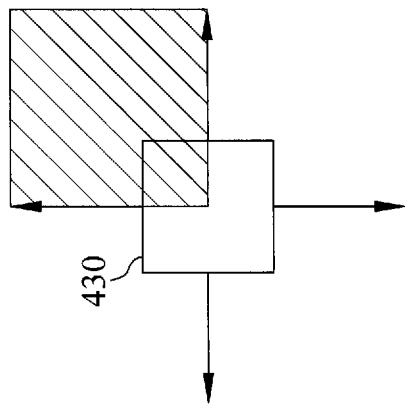
FIGS. 4A-4C show three movement types of the rectangle region in an image frame, respectively, consistent with certain disclosed embodiments.
Figure 4B:
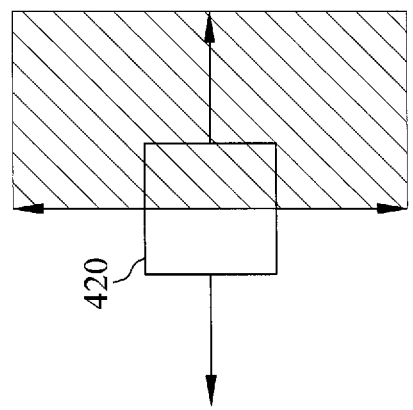
Figure 4A:
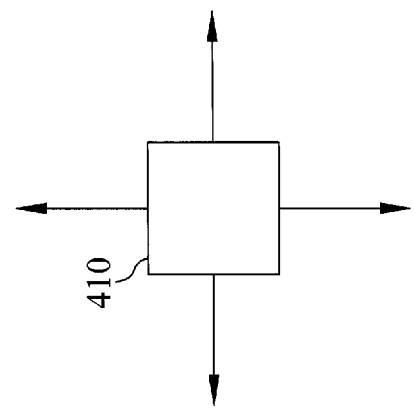

The selection of the ROI and the theory of feature point detection are explained with the following example. When a user selects an ROI, assumed to be a W×H rectangle, where W and H are the width and height of the rectangle respectively. At first, m Harris feature points with maximum response are obtained. The selection of the m feature points is to observe the rectangle region in an image frame and move the rectangle region slightly along different directions within the image frame to learn the gray scale change of the rectangle region. There are three types of possible gray scale change scenarios. The first is the gray scale change is flat. That is, regardless which direction to move, the gray scale of the rectangle region has no obvious change, as shown in rectangle region 410 of FIG. 4A. The second scenario is when the rectangle region moves around the boundary or line, the strong gray scale change will occur if the movement is perpendicular to the boundary or the line. As shown in FIG. 4B, rectangle region 420 moves to the right, and the right side shows strong gray scale change. The third scenario is when the rectangle region moves within the image region with feature points. Regardless of which direction to move, the rectangle region will show strong gray scale change. As shown in FIG. 4C, rectangle region 430 always shows strong gray scale change when rectangle region 430 moves up, down, right or left.

Accordingly, after the rectangle region moves along each direction, the sum of the change may be expressed as:

$$E_{x,y} = \sum_{u,v} w_{u,v} |I_{x+u,y+v} - I_{u,v}| \quad (1)$$

where $w_{u,v}$ is the defined rectangle region. If point (u,v) is located within the region, $w_{u,v}$ is 1; otherwise, the value is 0. $I_{u,v}$ is the gray scale value of point (u,v) in the image, and x and y are the displacement in x and y direction respectively.

Equation (1) may be expressed as Taylor series and after estimating the gradient of image I in the x and y directions, equation (1) may be simplified as:

$$E_{x,y} = Ax^2 + 2Cxy + By^2 \quad (2)$$

where $A = \left(\frac{\partial I}{\partial x}\right)^2 w_{u,v}$, $B = \left(\frac{\partial I}{\partial y}\right)^2 w_{u,v}$, $C = \left(\frac{\partial I}{\partial x}\right)\left(\frac{\partial I}{\partial y}\right) w_{u,v}$.

To reduce the noise effect in the image, the two-dimensional $w_{u,v}$ is replaced by Gaussian function, and equation (2) is expressed as a matrix:

$$E_{x,y} = (x,y)Z(x,y)^T \quad (3)$$

where Z is a 2×2 symmetric matrix of gray scale change:

$$Z = \begin{bmatrix} A & C \\ C & B \end{bmatrix}.$$

Let $\lambda_1$, $\lambda_2$ be eigenvalues of matrix Z. Based on the values of $\lambda_1$, $\lambda_2$, (1) if both $\lambda_1$ and $\lambda_2$ are small, the gray scale change of the region is not obvious; (2) if one of $\lambda_1$ and $\lambda_2$ is large and the other is small, the region includes a boundary or a line; and (3) if both $\lambda_1$ and $\lambda_2$ are large, the region shows strong gray scale change in every direction, i.e., the region includes feature points. Therefore, a gray scale change response function R(Z) may be set to determine whether the point is a feature point:

$$R(Z) = \det(Z) - k \cdot \text{trace}^2(Z) \quad (4)$$
$$= \lambda_1 \lambda_2 - k \cdot (\lambda_1 + \lambda_2)^2$$

where k is a constant, det(Z) is the determinant of matrix Z, and trace(Z) is the sum of the main diagonal of matrix Z. Through computing R, the first m with maximum gray scale change response within the ROI may be selected for tracking, and are added to track list $M = \{p_1, p_2, \ldots, p_m\}$. The feature point tracking list may be stored in feature point detecting and tracking module 310.

Figure 5A:
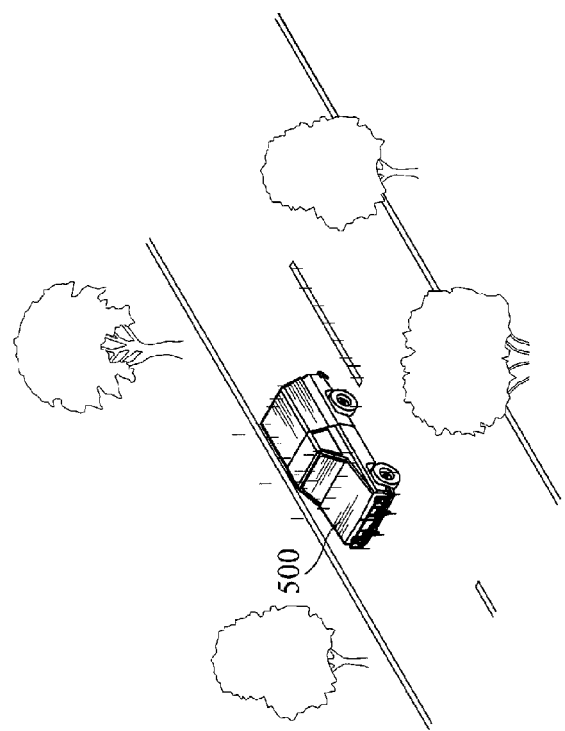
FIG. 5A shows an exemplary schematic view illustrating how the feature point detecting and tracking module detects feature points on a moving vehicle, where "+" indicates a detected feature point, consistent with certain disclosed embodiments.
Figure 5B:
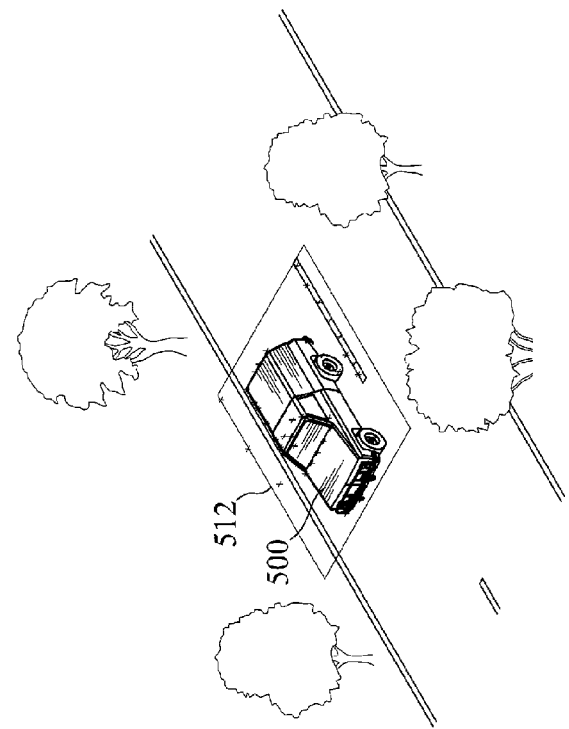
FIG. 5B shows an exemplary schematic view illustrating how the feature point detecting and tracking module uses the KLT method to track feature points, where "−" is the motion vector of a moving vehicle, consistent with certain disclosed embodiments.

In the exemplar of FIG. 5A, feature point detecting and tracking module 310 selects an ROI 512 on a moving car 500 at start time (t=0), and performs a local feature point detection on ROI 512, where symbol "+" is used to mark the detected feature point. FIG. 5B shows feature point detecting and tracking module 310 using KLT method for feature point tracking, where symbol "+" is the motion vector of moving vehicle 500. The estimated location of the feature point in the next image frame in FIG. 5 and the feature point tracking theory are described as follows.

Assume that the same feature point $p_i$ does not change appearance (i.e., appearance invariance) at two consecutive time t and t+1, in other words, $I_t(x,y) = I_{t+1}(x+u, y+v)$, where (u,v) is the motion vector of the point. The Taylor series of the equation is:

$$I_{t+1}(x+u, y+v) \approx I_{t+1}(x, y) + \frac{\partial I}{\partial x}u + \frac{\partial I}{\partial x}v \quad (5)$$

Considering that the point satisfying the appearance variance, equation (5) may be inducted as:

$$\begin{aligned} 0 &= I_{t+1}(x+u, y+v) - I_t(x, y) \\ &\approx I_{t+1}(x, y) + I_x u + I_y v - I_t(x, y) \\ &\approx (I_{t+1}(x, y) - I_t(x, y)) + I_x u + I_y v \\ &\approx I_t + I_x u + I_y v \end{aligned} \quad (6)$$

where $I_t = \frac{\partial I}{\partial t}, I_x = \frac{\partial I}{\partial x}$ and $I_y = \frac{\partial I}{\partial y}$.

Because equation (6) has two variables u and v, and only one equation, assume that the nearby point of the above point also has the same motion vector. Equation (6) may be expanded as follows by using the above point as the center of an n×n window:

$$\begin{bmatrix} I_x(p_1) & I_y(p_1) \\ I_x(p_2) & I_y(p_2) \\ \cdots & \cdots \\ I_x(p_{n^2}) & I_y(p_{n^2}) \end{bmatrix} \begin{bmatrix} u \\ v \end{bmatrix} = - \begin{bmatrix} I_t(p_1) \\ I_t(p_2) \\ \cdots \\ I_t(p_{n^2}) \end{bmatrix} \quad (7)$$

In this manner, the least square sum method may be used to solve equation (7) to obtain u and v, that is, the motion vector of the feature point, and the location within the next image frame may be estimated.

FIGS. 6A-6C show schematic views of the transform relationship of ROIs in two consecutive image frames obtained by linear transformation module 320, consistent with certain disclosed embodiments. In the exemplar of FIGS. 6A-6C, the transform relationship of ROIs in two consecutive image frames can be expressed as:

$$P_a = H_{ba} P_b \quad (8)$$

where a and b are locations of wide-angle camera (installed on an aerial vehicle) at two different times, as shown in FIG. 6A. $P_a$ is the projection of the ROI of the former image frame at the wide angle camera location a, as shown in FIG. 6A. $P_b$ is the projection of the ROI of the latter image frame at the wide angle camera location b, as shown in FIG. 6B. $H_{ba}$ is the homography perspective projection transformation relationship between $P_b$ and $P_a$. $H_{ba}$ is a 3×3 matrix, expressed as follows:

$$H_{ba} = \begin{bmatrix} h_{11} & h_{12} & h_{13} \\ h_{21} & h_{22} & h_{23} \\ h_{31} & h_{32} & h_{33} \end{bmatrix} \quad (9)$$

The homography transform $H_{ba}$ is to compute the transform relationship of the same plane at different view angles for the corresponding feature points of two consecutive image frames, as shown in FIG. 6B and FIG. 6C. Because the feature point tracking is executed through KLT method, the feature point relationship in two consecutive image frames is known, and may substitute to equation (8). With least square sum method, $H_{ba}$ may be obtained, i.e., homography transform matrix.

FIGS. 7A-7C show exemplary schematic views illustrating the estimation and update module uses Kalman filter for filtering and ROI estimation, consistent with certain disclosed embodiments. Estimation and update module 330 uses Kalman filter to correct the four corners $\{(x_1,y_1), (x_2,y_2), (x_3,y_3), (x_4,y_4)\}$ of the ROI, and assumes that each corner is an independent and constant velocity motion module. That is, the state vector of Kalman filter is assumed to be $X = [x_1 y_1 \Delta x_1 \Delta y_1 x_2 y_2 \Delta x_2 \Delta y_2 \ldots x_4 y_4 \Delta x_4 \Delta y_4]$, where $\Delta x$ and $\Delta y$ are velocity along the x and y direction respectively.

In the exemplar of FIG. 7B, ROI 720 of time t+1 is predicted based on four corners of $\{(x_1,y_1), (x_2,y_2), (x_3,y_3), (x_4,y_4)\}$ of ROI 710 of FIG. 7A at time t and ROI 725 is predicted at time t+1 in order to correct the predicted ROI 720 of time t+1. The corrected ROI at time t+1 is shown as ROI 730 in FIG. 7C. The filtering and the ROI estimation theory of FIGS. 7A-7C are described as follows.

Under Bayes' theorem, the object tracking problem may be transformed into an inference problem, that is, with the known prior probability of the state of the tracked object, to obtain the posterior probability of the state of the object after obtaining new measurement. Assume that the state vector of the tracked object is $\{x_t\}_{t=1,2,\ldots}$, where t is the discrete time sequence. The corresponding state equation is $x_{t+1} = A_t x_t + V_t$, where A is the state transform function, indicating the motion model of the object from time t to time t+1, and V is the noise accompanying the motion. Let the observed feature vector of the object be $\{z_t\}_{t=1,2,\ldots}$. Then, the corresponding measurement equation will be $z_t = H_t x_t + W_t$, where H is the measurement transform function describing the object state and the transform relationship between the measured feature vectors, and W is the noise accompanying the measuring.

With state transform and measurement equation, the two tasks of object tracking include estimating state of time t+1 based on the measurements before time t, and correcting estimated state based on the measurement at time t=1. The former task is to compute $p(x_{t+1}|z_{1:t}) \propto p(x_{t+1}|x_t) p(x_t|z_{1:t})$ and the latter task is to compute $p(x_{t+1}|a_{1:t+1}) \propto p(z_{t+1}|x_{t+1}) p(x_{t+1} a_{1:t})$. Through continuous computation of the above two equations to estimate and correct the state of the moving object, the moving object is tracked. When the relation between state transform function A and measurement transform function H is linear in the system, and both state transform noise V and measurement noise W satisfy Gaussian model, estimation and update module 330 may use Kalman filter to obtain the posterior probability.

Figure 8:
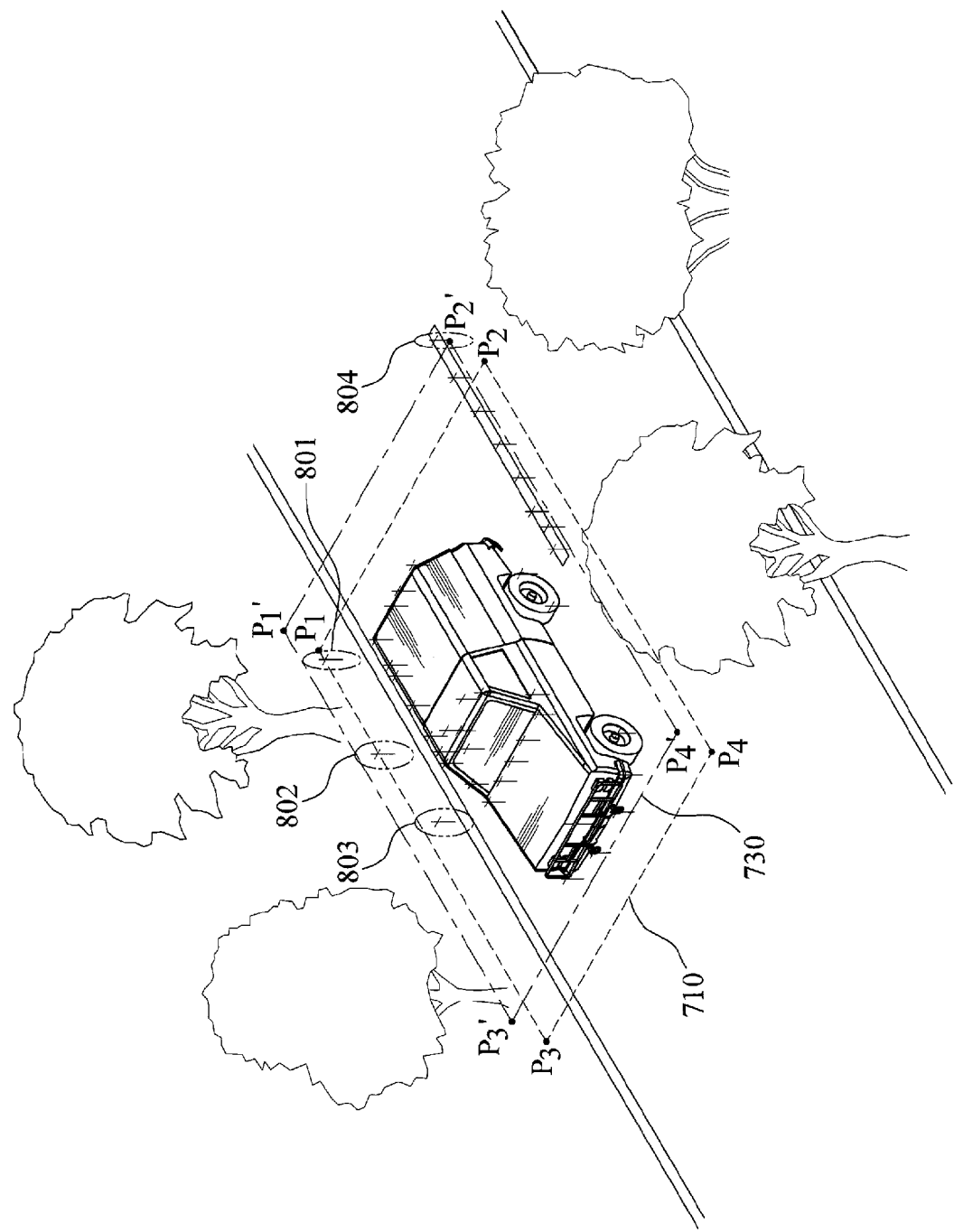
FIG. 8 shows an exemplary schematic view of outlier rejection, consistent with certain disclosed embodiments.

FIG. 8 shows an exemplary schematic view of outlier rejection, consistent with certain disclosed embodiments. As shown in FIG. 8, outlier rejection module 340 may use the corrected result of ROI from estimation and update module 330 to remove at least an outlier (feature point) outside of the ROI. The removed outlier may be an outlier caused, for example, by tracking errors. In the exemplar of FIG. 8, the four circles marked as 801-804 are the rejected outliers. The theory of outlier rejection module of FIG. 8 is described as follows.

Assume that at time t, the four corners of ROI 810 in image frame are $p_t = \{p_1, p_2, p_3, p_4\}$. After update by Kalman filter, at time t+1, the four corners of ROI 820 in image frame are $p_{t+1} = \{p_{1'}, p_{2'}, p_{3'}, p_{4'}\}$. Substitute the $P_b$ and $P_a$ of equation (8) with $p_t$ and $p_{t+1}$, the homography transform matrix $H_{ROI}$ of two ROIs may be obtained. Then, inspecting all the feature points $p_{,t}$ and corresponding $p_{,t+1}$ of ROIs in the two consecutive image frames (time t and time t+1), if the equation $|p_{,t+1} - H_{ROI} p_{,t}| > \gamma$ is satisfied, the feature point is not within the ROI. Hence, the feature point is viewed as an outlier and rejected. $\gamma$ is a pre-set threshold.

The above outlier rejection strategy will gradually reduce the number of feature points. Therefore, the exemplary embodiments of the present disclosure take the stability of the tracking system into account by setting a condition for feature point re-detection to perform feature point re-detection on the current ROI. For example, when the number of feature points is less than the pre-set ratio of the number of initial feature points m, e.g., less than 20%, the detection of feature points of current ROI is performed again. On the other hand, because the moving object moves continuously, the ROI may leave the field of view. Therefore, a condition is also set when at least an edge point of the ROI leaves the effective region of the image frame, the tracking of the ROI terminates.

Figure 9:
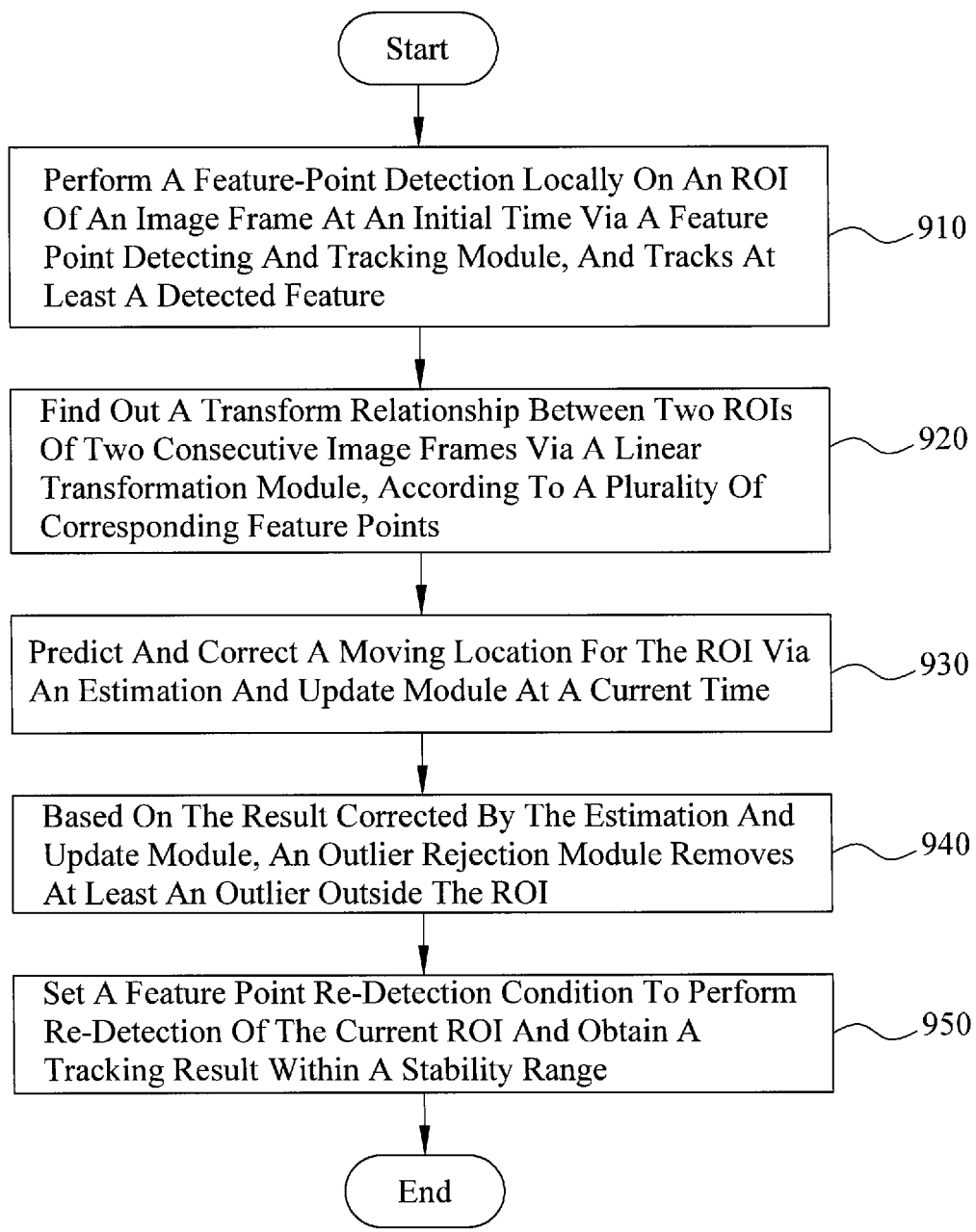
FIG. 9 shows an exemplary flowchart of a ROI tracking method, consistent with certain disclosed embodiments.

Accordingly, FIG. 9 shows an exemplary flowchart of a ROI tracking method, consistent with certain disclosed embodiments. As shown in FIG. 9, at the initial time, feature-point detection is performed locally on an ROI of an image frame at an initial time via a feature point detecting and tracking module, and tracks the detected features, as shown in step 910. A transform relationship between two ROIs of two consecutive image frames is then found out via a linear transformation module, by using a plurality of corresponding feature points, as shown in step 920. In step 930, an estimation and update module is used to predict and correct a moving location for the ROI at a current time. In step 940, based on the result corrected by the estimation and update module, an outlier rejection module removes at least an outlier outside the ROI. In step 950, a feature point re-detection condition is set to perform re-detection of the current ROI and a tracking result within a stability range is obtained. The feature point re-detection condition and the details of each step are described earlier, and are omitted here.

Figure 10:
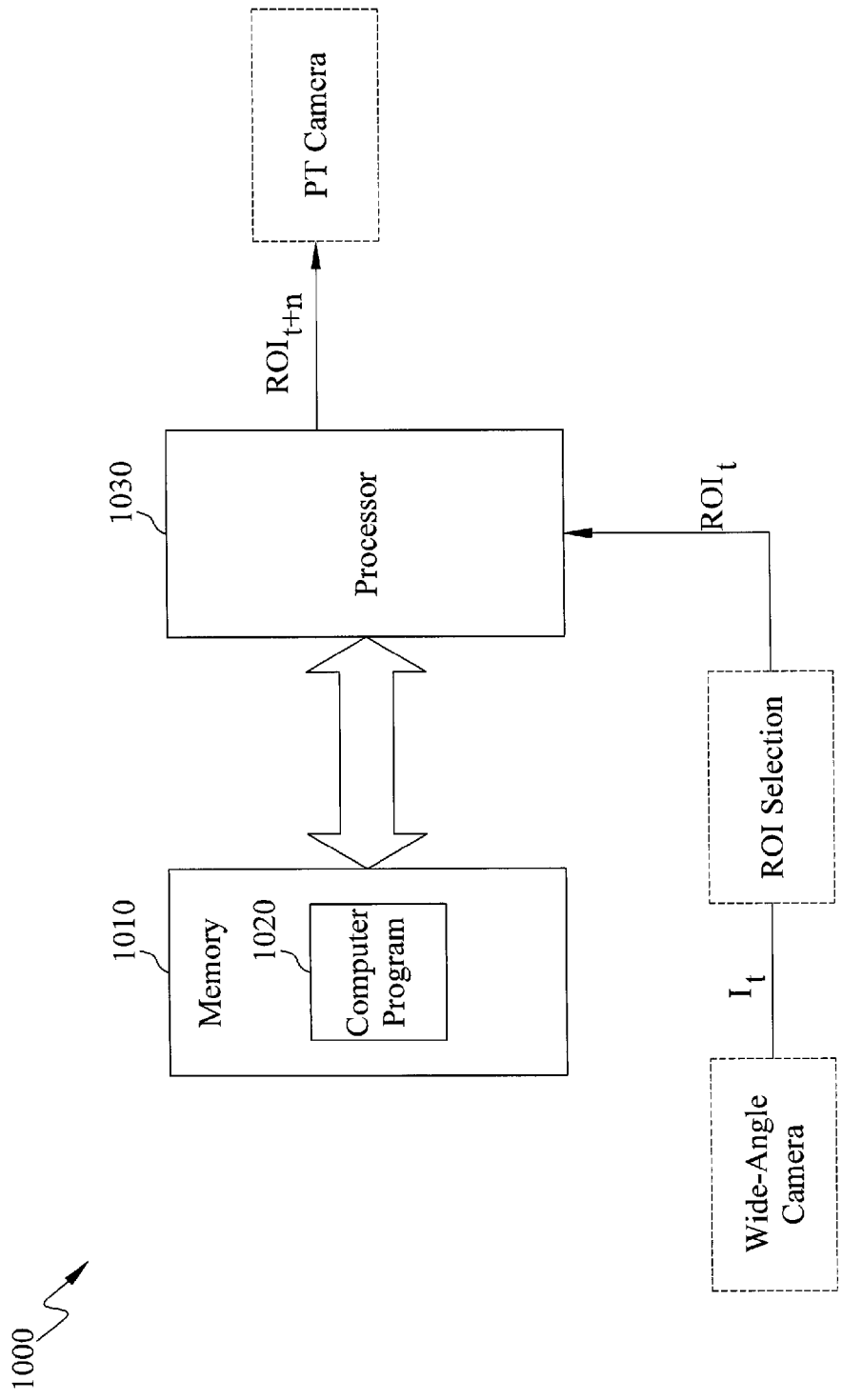
FIG. 10 shows an exemplary schematic view illustrating a computer program product and an application scene for ROI tracking, consistent with certain disclosed embodiments.

The disclosed exemplary embodiment may also be realized with a computer program product. As shown in FIG. 10, computer program product 1000 at least comprises a memory 1010 and an executable 1020 stored in memory 1010. The computer program may be executable on a processor 1030 or computer system to execute steps 910-950 of ROI tracking method in FIG. 9. Processor 1030 may further include feature point detecting and tracking module 310, linear transformation module 320, estimation and update module 330 and outlier rejection module 340. With these modules, steps 910-940 are executed, and processor 1030 may set a feature point re-detection condition to re-detect feature points in the current ROI to achieve a tracking result of a stability range.

In the exemplar of FIG. 10, processor or computer system 1030 may be combined with two cameras, as the exemplar of FIG. 2, for data transmission and the ROI tracking.

The ROI of the disclosed exemplary embodiments may be a stationary object, moving object, fixed background, or fixed background with moving object. In comparison with the tracking results from current tracking technologies, when the ROI is a stationary object, the tracking result of the disclosed exemplary embodiments can stably lock-in the ROI, and is not affected by the close color distribution between the ROI and surroundings. When the ROI is a moving object, the disclosed exemplary embodiments need neither to construct background mode nor to compute descriptor of feature points.

Instead, the disclosed exemplary embodiments obtain the entire ROI trajectory through feature point tracking, and the tracking result is smooth and stable. When the ROI is large and includes both moving object and fixed background, the disclosed exemplary embodiments can filter out the background feature points as outliers to achieve a stable tracking result, unlike the mean value shift method that has error accumulation and shift phenomenon because the ROI also includes background information.

When the feature point tracking fails, the disclosed exemplary embodiments uses the prediction capability of estimate and update module, such as, Kalman filter, to track more image frames than the conventional RANSAC method. Because the disclosed exemplary embodiments do not need recursive computation, the disclosed exemplary embodiments consume far less resources and cost than RANSAC method according to the experimental data. In comparison with mean value shift method, the disclosed exemplary embodiments consume almost the same amount of resource or cost, but the disclosed exemplary embodiments show a more stable and excellent tracking result.

In summary, the disclosed exemplary embodiments provide an image-based ROI tracking technology, including ROI tracking system, method and computer program product thereof. By combining feature point detecting and tracking, homography transform matrix, tracking of estimation and update module (such as, Kalman filter), and outlier rejection technology, the disclosed exemplary embodiments may achieve stable and smooth ROI tracking. The ROI may be a moving object, background or both. Through the homography perspective projection transform of feature point tracking, the disclosed exemplary embodiments may estimate the motion situation of the ROI. Through the prediction and update capability of, such as, Kalman filter, the stable and smooth ROI tracking result can be achieved. Based on the Kalman filter tracking result, the outliers outside of the ROI can be removed.

Although the present invention has been described with reference to the disclosed exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tracking system for region-of-interest (ROI), comprising:
    a feature point detecting and tracking module that performs feature-point detection locally on an ROI of an image frame at an initial time and tracks a detected at least a feature point;
    a re-detection module that sets a re-detection condition for performing a feature point re-detection in said ROI at a current time to obtain a tracking result within a stability range;
    wherein said re-detection condition for performing a feature point re-detection is when a number of said detected at least a feature point is less than a pre-set percentage of a number of initial feature points;
    a linear transformation module that finds out a transform relationship between two ROIs of two consecutive image frames, by using a plurality of corresponding tracked feature points;
    an estimation and update module that predicts and corrects a moving location for said ROI at a current time; and
    an outlier rejection module that removes at least an outlier outside of said ROI, based on a result corrected by said estimation and update module.

2. The tracking system as claimed in claim 1, wherein said ROI is includes a moving object, a fixed background or both.

3. The tracking system as claimed in claim 1, said system sets a condition for a feature point re-detection to trigger execution of a feature point re-detecting on said ROI at said current time.

4. The tracking system as claimed in claim 1, said system terminates tracking said ROI when at least an edge point of said ROI leaves an effective region of said image frame.

5. The tracking system as claimed in claim 1, wherein said transform relationship between said ROIs of two consecutive image frames is a homography transform relationship.

6. The tracking system as claimed in claim 1, wherein said estimation and update module predicts and corrects the motion location of said ROI via a Kalman filter.

7. The tracking system as claimed in claim 3, wherein said feature point detecting and tracking module further includes a feature point tracking list for storing first m points with maximum gray scale change response with said ROI, and m is an integer greater than 1.

8. A tracking method for region-of-interest (ROI), applicable to a tracking system, said method comprising using a computer system to execute operations including:
  performing a feature-point detection locally on an ROI of an image frame at an initial time via a feature point detecting and tracking module, and tracking at least a detected feature point;
  finding out a transform relationship between two ROIs of two consecutive image frames via a linear transformation module, according to a plurality of corresponding tracked feature points;
  using an estimation and update module to predict and correct a moving location for said ROI at a current time;
  based on result corrected by said estimation and update module, removing at least an outlier outside of said ROI via an outlier rejection module; and
  setting a re-detection condition for performing a feature point re-detection in said ROI at current time to obtain a tracking result within a stability range;
  wherein said re-detection condition for performing a feature point re-detection is when a number of said at least a detected feature point is less than a pre-set percentage of a number of initial feature points.

9. The tracking method as claimed in claim 8, said method further includes:
  terminating tracking said ROI when at least an edge point of said ROI leaves an effective region of said image frame.

10. The tracking method as claimed in claim 8, wherein said transform relationship between said ROIs of two consecutive image frames is a homography perspective projection transform relationship.

11. The tracking method as claimed in claim 8, wherein in said feature-point detection locally on said ROI, said method sets a gray scale change response function R(Z) to determine whether a point in said ROI is a feature point, and Z is a symmetric matrix of gray scale change.

12. The tracking method as claimed in claim 8, wherein through computing gray scale change response function R, first m points with maximum gray scale change response within said ROI are selected for tracking and are added to a feature point tracking list, and m is an integer greater than 1.

13. The tracking method as claimed in claim 8, wherein all feature points $p_{,t}$ and corresponding $p_{,t+1}$ of ROIs in said two consecutive image frames are checked, and when equation $|p_{,t+1} - H_{ROI} p_{,t}| > \gamma$ is satisfied, said corresponding feature point $p_{,t+1}$ is not within said ROI, and is viewed as an outlier and rejected, $\gamma$ is a pre-set threshold, $H_{ROI}$ is the transform relationship between ROIs of two consecutive image frames, t and t+1 are two consecutive times.

14. A computer program product for region-of-interest (ROI) tracking, said computer program product comprising a memory and an executable computer program stored in said memory, said computer program configured to execute via a processor:
  performing a feature-point detection locally on an ROI of an image frame at an initial time via a feature point detecting and tracking module, and tracking at least a detected feature point;
  finding out a transform relationship between two ROIs of two consecutive image frames via a linear transformation module, according to a plurality of corresponding tracked feature points;
  predicting and correcting a moving location for said ROI via an estimation and update module at a current time;
  based on result corrected by said estimation and update module, removing at least an outlier outside of said ROI via an outlier rejection module; and
  setting a re-detection condition for feature points to perform a feature point re-detection in said ROI at said current time to obtain a tracking result within a stability rang %
  wherein said re-detection condition for feature points to perform a feature point re-detection is when a number of said at least a detected feature point is less than a pre-set percentage of a number of initial feature points.

15. The computer program product as claimed in claim 14, wherein said processor further includes said feature point detecting and tracking module, said linear transformation module, said estimation and update module and said outlier rejection module.

* * * * *